United States Patent [19]

DiFalco, Jr. et al.

[11] Patent Number: 5,075,118

[45] Date of Patent: Dec. 24, 1991

[54] METHOD FOR MAKING SUGARLESS XYLITOL CONTAINING CHEWING GUM

[75] Inventors: Mario N. DiFalco, Jr., Chicago; David Witkewitz, Bridgeview, both of Ill.

[73] Assignee: Wm. Wrigley Jr. Company, Chicago, Ill.

[21] Appl. No.: 590,018

[22] Filed: Sep. 28, 1990

[51] Int. Cl.$^5$ .............................................. A23G 3/30
[52] U.S. Cl. ........................................ 426/3; 426/658; 426/548; 426/804
[58] Field of Search .................................. 426/3-6, 426/548, 804, 658

[56] References Cited

U.S. PATENT DOCUMENTS

| | | | |
|---|---|---|---|
| 3,899,593 | 8/1975 | Hammond et al. | 426/3 |
| 4,003,320 | 12/1976 | Klose | 426/3 |
| 4,271,197 | 6/1981 | Hopkins et al. | 426/3 |
| 4,329,569 | 5/1982 | Tezuka et al. | 426/3 |
| 4,452,820 | 6/1984 | D'Amelia | 426/3 |
| 4,806,364 | 2/1989 | Kubota et al. | 426/5 |
| 4,861,600 | 8/1989 | Chisari et al. | 426/5 |
| 4,931,294 | 6/1990 | Yatka et al. | 426/3 |

*Primary Examiner*—Jeanette Hunter
*Attorney, Agent, or Firm*—Willian, Brinks, Olds, Hofer, Gilson & Lione

[57] ABSTRACT

A method for mixing sugarless xylitol containing chewing gums wherein a substantially homogeneous mixture of gum base, alditols other than xylitol, softener, and flavor is first formed, and the xylitol is added to the substantially homogeneous mixture. The mixing schedule enhances gum handling and processing.

5 Claims, No Drawings

METHOD FOR MAKING SUGARLESS XYLITOL CONTAINING CHEWING GUM

FIELD OF THE INVENTION

This invention relates to sugarless xylitol containing chewing gums. More specifically, this invention relates to a method for mixing such gums.

BACKGROUND OF THE INVENTION

Chewing gum ingredients are generally mixed according to mixing schedules to form a gum matrix, and the matrix is then sheeted, scored, and tempered before being formed into a gum product. Different chewing gums may require different mixing schedules. For example, sugarless gums, which contain glycerine and alditols, such as sorbitol and mannitol, are typically mixed according to the following schedule. After the chewing gum base is softened, usually by heating and mixing, a major portion of an alditol, usually sorbitol, is added as a bulking agent to form a matrix. Then glycerin is added to the softened matrix, and is dispersed by the sorbitol. Thereafter, another alditol, usually mannitol is added. The mannitol tends to dry the gum mixture, making handling and packaging easier.

When xylitol is one of the alditols added early in the mixing schedule, an unacceptable gum matrix is obtained. The matrix is soft and adheres to blades, rollers, and finishing knives, which makes it difficult to remove the matrix from the mixer, and difficult to sheet and score. The matrix also has a low dimensional stability, which further complicates sheeting, scoring and makes packaging difficult and expensive. A gum matrix with a low dimensional stability will not acceptably maintain its original thickness and width. Thus, a high dimensional stability gum matrix is preferred.

SUMMARY OF THE INVENTION

The present invention provides a unique mixing schedule for xylitol-containing sugarless chewing gums. A homogeneous gum matrix is first formed by mixing all of the gum base, all of the flavor, and all of the sugarless bulking agent, except xylitol. The xylitol is then added to the homogeneous gum matrix. In another embodiment, softeners are added to the homogeneous chewing gum matrix prior to adding the xylitol.

DETAILED DESCRIPTION OF THE INVENTION

It is believed that adding xylitol in a mixing schedule separately from other sugarless bulking agents and after any softener results in a harder, less sticky, gum matrix with a high dimensional stability. By adding xylitol near the end of the mix schedule, handling and packaging problems are minimized, because the possibility of the xylitol being wetted and melted is reduced. Without being limited to theory, it is believed that wetting of xylitol is reduced because the gum base matrix absorbs other liquid ingredients before the xylitol is added. Melting of the xylitol is reduced because the gum base matrix is near its coolest temperature at the end of the mixing process.

Thus, one object of the inventive mixing schedule is to prevent the xylitol from being excessively heated and wetted. A hot gum matrix will melt the xylitol and cause stickiness and low dimensional stability. If the xylitol is added to a non-homogeneous mixture, it could become wet by reacting with other alditols or softeners. Wetting of xylitol also causes the gum matrix to be sticky and have a low dimensional stability.

Wetting can be reduced by adding xylitol to a homogeneous chewing gum matrix. The mixing time required to obtain homogeneity is not important to the invention, as the rheology of the ingredients is controlling.

Any commonly known mixing equipment can be employed in the invention. Thus, sigma bladed mixers or extrusion equipment may be used. Preferably, the mixer is cleaned by scraping before the ingredients are added.

The ingredients may be added in any manner known in the art, and the actual time intervals between adding the ingredients is not critical. During mixing, the mixer jacket temperatures are maintained between about 100° F. and 20° F.

In general, a chewing gum composition comprises a water soluble bulk portion, a water insoluble chewable gum base portion, and, typically, water insoluble flavors. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobuylene-isoprene copolymer, styrene butadiene rubber as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include paraffin, microcrystalline and natural waxes such as beeswax and carnauba. The insoluble gum base constitutes between approximately 5 to 95 weight percent of the gum. Preferably the insoluble gum base comprises about 10 to approximately 50 weight percent of the gum and more preferably about 20 to approximately 30 weight percent.

The gum base typically also includes a filler component. The filler component such as calcium carbonate, magnesium carbonate, talc, dicalcium phosphate and the like. The filler may constitute between about 5 to approximately 60 weight percent of the gum base. Preferably, the filler comprises about 5 to 50 weight percent of the chewing gum base.

Gum base typically also contains softeners, including glycerol monostearate and glycerol triacetate. Further, gum bases may also contain optional ingredients such as antioxidents, colors and emulsifiers. The present invention contemplates employing any commercially acceptable gum base.

The water soluble portion of chewing gum may further comprise softeners, sweeteners, flavors and combinations thereof. The softeners are added to the chewing gum in order to optimize the chewability and mouthfeel of the gum. Softeners, also known in the art as plasticizers or plasticizing agents, generally constitute between approximately 0.5 to approximately 15 weight percent of the chewing gum. Softeners contemplated by the present invention include glycerin, lecithin, lycasin, and combinations thereof. Further, aqueous sweetener solutions such as those containing sorbitol, hydrogenated starch hydrolysates, corn syrup and combinations thereof may be used as softeners and binding agents in gum.

Sugarless sweeteners include components with sweetening characteristics but are devoid of the commonly known sugars and comprise but are not limited to sugar alcohols and alditols such as sorbitol, mannitol, xylitol, hydrogenated starch hydrolysates, maltitol, hydrogenated isomaltulose, and the like, alone or in any combination. Also contemplated are high intensity sweeteners such as aspartame, sucralose, acesulfame-K, alitame, thaumatin, monellin, and saccharin. Sugarless sweeteners may be present in the chewing gum from about 20 to about 80 weight percent.

A flavor may be present in a chewing gum in an amount from approximately 0.1 to about 10 weight percent and preferably from about 0.5 to approximately 3.0 weight percent of the gum. Flavors contemplated by the present invention include any liquid flavoring which is a food acceptable quality. The flavor may comprise essential oils, synthetic flavors, or mixtures thereof including but not limited to oils derived from plants and fruits such as citrus oils, fruit essences, peppermint oil, spearmint oil, clove oil, oil of wintergreen, anise, and the like. Artificial flavoring components are also contemplated by the present invention. Those skilled in the art will recognize that the natural and artificial flavors may be combined in any manner. All such flavors and blends are contemplated by the present invention.

Other ingredients such as colors, emulsifiers and pharmaceutical agents may be added to the chewing gum.

The following examples further illustrate the invention.

EXAMPLES

Chewing gums A, B, C, and D were prepared with the formulations shown in Table 1.

TABLE 1

CHEWING GUM FORMULATIONS

| Ingredient | A | B | C | D |
|---|---|---|---|---|
| Sorbitol | 34.75 | 38.25 | 28.67 | 28.43 |
| Mannitol | 12.00 | 12.00 | 12.00 | 12.00 |
| Xylitol | 14.00 | 14.00 | 16.00 | 16.00 |
| Gum Base | 30.00 | 30.00 | 30.00 | 30.00 |
| Glycerin | 3.50 | — | 7.00 | 7.00 |
| Salt Soln. (10%) | 0.05 | 0.05 | 0.05 | 0.05 |
| Glycerol monostearate | 0.20 | 0.20 | 0.20 | 0.25 |
| Flavor | 2.00 | 2.00 | 2.20 | 2.20 |
| CaCO$_3$ | 3.00 | 3.00 | 3.00 | 3.00 |
| Lecithin | 0.50 | 0.50 | 0.50 | 0.50 |
| Color | — | — | 0.20 | 0.20 |
| Aspartame | — | — | 0.41 | 0.41 |

Chewing gums A, B, C, and D were prepared according to the following mixing schedules:

| Ingredients and Action | Elapsed Mixing Time (Min:Sec) |
|---|---|
| Mixing Schedule for Gums A and B | |
| With mixer off, add base, glycerol monostearate, lecithin, and 10% NaCl solution; start mixer | 0:00 |
| Stop mixer | 2:00* |
| Add calcium carbonate; start mixer and begin adding sorbitol | 2:00 |
| Sorbitol addition complete | 3:30 |
| Add glycerin (Gum A only) | 4:00 |
| Stop mixer; add mannitol; start mixer | 5:00 |
| Begin adding flavor | 7:00 |
| Flavor addition complete; homogeneous mixture formed; stop mixer | 10:00 |
| Add xylitol; start mixer | 10:00 |
| Stop mixer; batch complete | 14:00 |
| *Matrix temperature was below 200° F. before proceeding to next step. | |
| Mixing Schedule for Gum C | |
| With mixer off, add base and glycerol monostearate; start mixer | 0:00 |
| Stop mixer | 2:00* |
| Add color, color dispersion, calcium carbonate, lecithin/spearmint flavor mixture** and 10% NaCl solution; start mixer | 2:00 |
| Stop mixer; add sorbitol fines; start mixer; begin adding sorbitol | 4:00 |
| Sorbitol addition complete | 5:30 |
| Stop mixer; add Mannito, xylitol, aspartame, encapsulated aspartame, encapsulated menthol, zein encapsulated aspartame, and glycerin; start mixer | 7:00 |
| Begin adding remaining spearmint flavor | 8:00 |
| Stop mixer; batch complete | 12:00 |
| *Matrix temperature was below 200° F. before proceeding to next step. | |
| **1.56 Kg lecithin and 2.90 Kg flavor. | |
| Mixing Schedule for Gum D | |
| With mixer off, add base and glycerol monostearate; start mixer | 0:00 |
| Stop mixer | 2:00* |
| Add color, color dispersion, calcium carbonate, lecithin/flavoring agent mixture** and 10% NaCl solution; start mixer | 2:00 |
| Stop mixer; add sorbitol fines; start mixer; begin adding sorbitol | 4:00 |
| Sorbitol addition complete | 5:30 |
| Stop mixer; add mannitol, xylitol, aspartame, encapsulated aspartame, encapsulated menthol, zein encapsulated aspartame, encapsulated peppermint flavor, and glycerin; start mixer | 7:00 |
| Begin adding remaining flavoring agent | 8:00 |
| Stop mixer; batch complete | 12:00 |
| *Mixture temperature was below 200° F. before proceeding to next step. | |
| **1.97 Kg lecithin and 2.90 Kg flavor. | |

Gums A and B were prepared according to the invention. Gum A contains glycerin, Gum B does not. The gum mixer was heated to about 120° F. before the ingredients were added. Gums A and B were easily removed from the mixer and easily sheeted.

Gums C and D were not prepared according to the invention. The gum mixer was heated to 120° F. for gums C and D before the ingredients were added. Gums C and D were sticky and difficult to remove from the mixer and easily sheeted.

We claim:

1. In a method for making a xylitol-containing sugarless chewing gum wherein at least a gum base, a sugarless bulking agent, flavor and xylitol are mixed, the improvement comprising:
    a) forming a gum matrix by mixing all of the gum base, all of the flavor, and all of the sugarless bulking agent except xylitol; and thereafter b) adding xylitol to the matrix whereby said addition of xylitol at the end of the process provides the chewing gum with an increased dimensional stability.

2. The method of claim 1 wherein the sugarless bulking agent of the gum matrix in step a) comprises sorbitol, mannitol, palatinose, or maltitol.

3. The method of claim 1 further comprising adding a softener prior to adding the xylitol.

4. The method of claim 3 wherein the softener comprises glycerin or lycasin.

5. A method for making a xylitol-containing sugarless chewing gum having an increased dimensional stability, said chewing gum containing at least a gum base, a sugarless bulking agent, flavor, and a softener, comprising:

a) forming a gum matrix by mixing all of the gum base, all of the flavor, all of the softener, and all of the sugarless bulking agent except xylitol; and thereafter b) adding xylitol to the matrix.

* * * * *